INVENTOR.
Mahmoud I. Kazimi
BY
Townsend and Townsend
attorneys

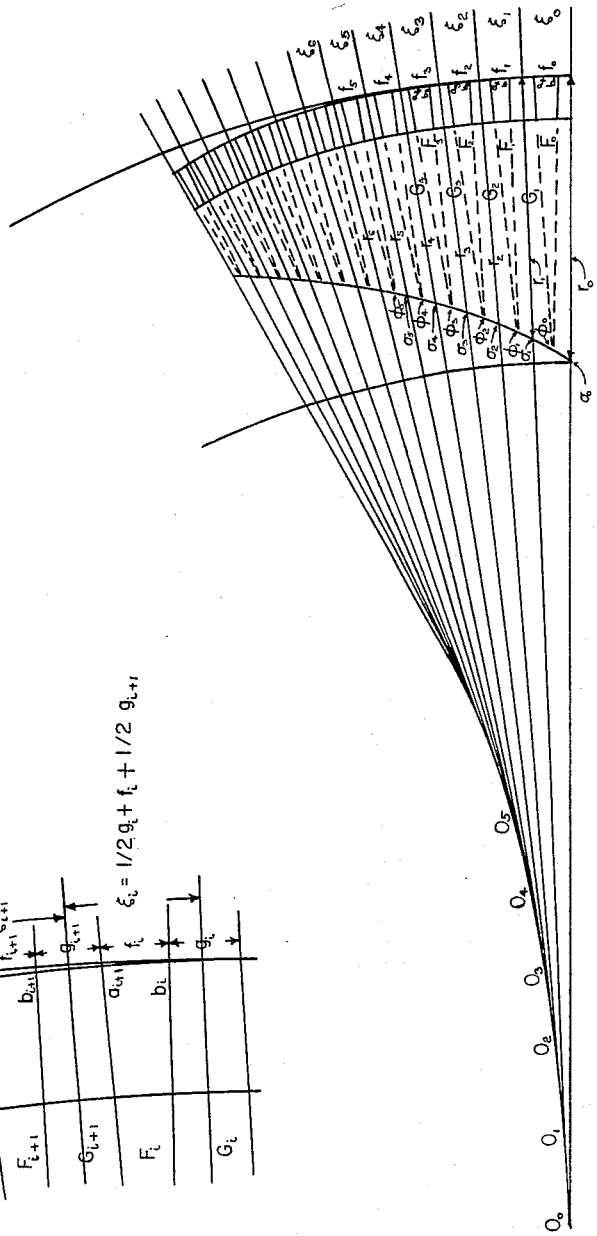
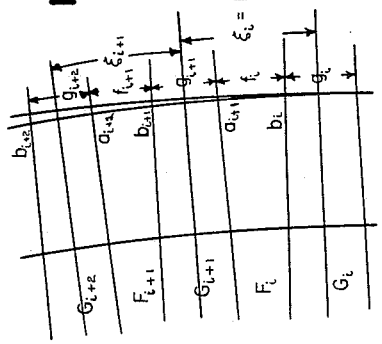

Feb. 16, 1965     M. I. KAZIMI     3,169,898
CURVATURED HONEYCOMB AND METHOD OF MAKING SAME
Filed March 7, 1961            7 Sheets-Sheet 3

INVENTOR.
Mahmoud I. Kazimi
BY

Feb. 16, 1965    M. I. KAZIMI    3,169,898
CURVATURED HONEYCOMB AND METHOD OF MAKING SAME
Filed March 7, 1961    7 Sheets-Sheet 4

Fig. 7.

X-X' IS AN AXIS OF A CELL.

Z-Z' IS A TANGENT TO THE SURFACE ∥ TO THE AXIS OF THE CONE (₵) AND ⊥ TO X-X'.

Y-Y' IS ⊥ TO X-X' AND ⊥ TO Z-Z'.

Z-Z' AND Y-Y' DETERMINE A TANGENT PLANE ⊥ TO A CELL IN THE CYLINDER.

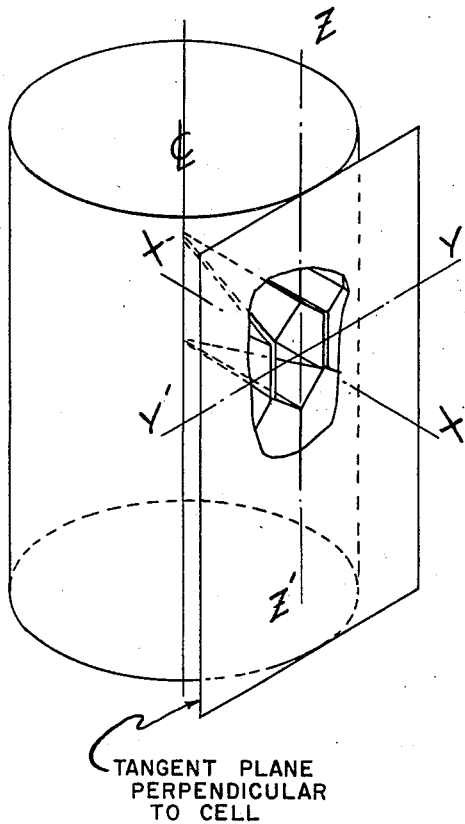

TANGENT PLANE PERPENDICULAR TO CELL

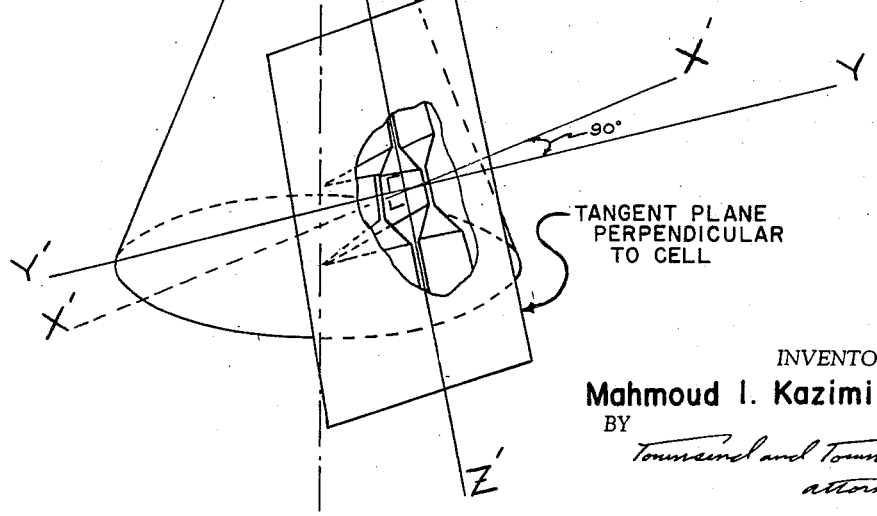

Fig. 6.

TANGENT PLANE PERPENDICULAR TO CELL

INVENTOR.
Mahmoud I. Kazimi
BY
Townsend and Townsend
attorneys

Feb. 16, 1965    M. I. KAZIMI    3,169,898
CURVATURED HONEYCOMB AND METHOD OF MAKING SAME
Filed March 7, 1961    7 Sheets-Sheet 5

INVENTOR.
Mahmoud I. Kazimi
BY
Townsend and Townsend
attorneys

Feb. 16, 1965   M. I. KAZIMI   3,169,898
CURVATURED HONEYCOMB AND METHOD OF MAKING SAME
Filed March 7, 1961   7 Sheets-Sheet 6

*INVENTOR.*
Mahmoud I. Kazimi
BY

Feb. 16, 1965  M. I. KAZIMI  3,169,898
CURVATURED HONEYCOMB AND METHOD OF MAKING SAME
Filed March 7, 1961  7 Sheets-Sheet 7

INVENTOR.
Mahmoud I. Kazimi
BY
Townsend and Townsend
attorneys

United States Patent Office 3,169,898
Patented Feb. 16, 1965

3,169,898
CURVATURED HONEYCOMB AND METHOD OF MAKING SAME
Mahmoud I. Kazimi, Berkeley, Calif., assignor to Hexcel Products Inc., Berkeley, Calif.
Filed Mar. 7, 1961, Ser. No. 93,895
13 Claims. (Cl. 161—68)

This invention relates to the art of forming honeycomb into conical, cylindrical and similar bodies.

Heretofore it has been proposed to form honeycomb into curved bodies by a number of processes.

The most basic, and perhaps oldest, method of curving honeycomb is exemplified by the old-fashioned paper Christmas tree bells made of paper honeycomb. In these types of structures the honeycomb is manufactured in an unexpanded condition, and without pre-expanding the cells, the material can be curved about an axis parallel to the ribbons or webs of paper.

When considering honeycomb as a structural core material for sandwich structures, and where it is almost always a primary object to provide a structure having a high strength/weight ratio, the above-described method of curving honeycomb is unsatisfactory. In the first place, only the honeycomb cells defining the outer face of the material open out and expand while the ribbon edges defining the inner face of the material remain tightly compacted. Hence, the resultant curved honeycomb body has a much greater over-all density than normal expanded honeycomb, and this renders impossible the attaining of an optimum strength/weight ratio. Further, because the material defines expanded cells at its outer face and unexpanded cells at its inner face, the material lacks uniform structural characteristics throughout its thickness. Finally, because the material only partially expands, the material does not provide optimum structural strength in a direction normal to the ribbon direction of the honeycomb material.

U.S. Patent No. 2,668,327 teaches the concept of preforming honeycomb (having anti-clastic properties) with a saddle-back compensating curve along one major axis, whereby the material can be formed with a proper curvature extending along the other major axis perpendicular to the first.

It has also been proposed to scarf or knife-cut honeycomb along one of its faces to permit the material to be bent, whereby the scarfed surface (defining the smaller or inner radius of curvature) permits the material to structurally collapse and bend or curve.

It has also been proposed to form honeycomb with rectangular cells either by structurally collapsing expanded hexagonal material or by over-expanding hexagonal material. An example of the former method is set forth in Pajak Patent No. 2,704,587.

The deficiencies of these latter mentioned practices are severalfold, as for example, by deforming the material into a rectangular pattern, the strength characteristic of the material along the axis normal to the ribbon direction of the material is substantially weakened. In the case where the rectangular cells are formed by structurally collapsing the cell walls as exemplified in the Pajak Patent No. 2,704,587, the material loses structural integrity by the mere fact that it is deformed through structural collapse in the first instance.

Other methods of curving honeycomb have also been proposed, but each sacrifices some desirable property of the honeycomb—such as strength or weight—to achieve its ultimate purpose.

A principal object of the present invention is to provide a stress-free curvatured honeycomb body of conical cylindrical form and to teach a method of forming said product.

A further principal object of this invention is to provide a method by which honeycomb can be produced with the ribbon direction parallel to the axis of the symmetrical surface of revolution. An unexpanded block of honeycomb is provided which may be expanded into the finished form. Alternatively, the corrugation method of forming honeycomb may be employed.

A feature of the present invention is that the area of the unexpanded block of honeycomb is totally consumed by the sets of glue areas and sets of free areas which are employed in producing the block. Expressed in other terms, when the unexpanded honeycomb is laid out, the glue areas and free areas are plotted in such manner that there is no necessity of shrinking or cutting out portions of material or stretching portions, etc., at any point or points to fulfill the demand for the shape which is produced when the block is expanded. This feature of the invention contributes greatly to the over-all strength of the completed shape.

Another feature of the present invention is the fact that at no instant in the expansion or while expansion is taking place from an unexpanded block to the finished expanded form is the material in the honeycomb caused to fail. Expressed in other terms, the glue area remains in a defined flat plane, and at no instant is the glue area forced out of this plane during expansion. It is true that the plane of the glue area is as a unit carried into a rotational or translational motion but, nevertheless, during this motion every point that is originally in the plane of the glue area remain in said plane through the whole operation. Here again, obvious advantages reside in maintaining the glue area as free from stress as possible during expansion.

Correspondingly, the sets of free lengths and their plane likewise are not stressed or caused to fail. These planes remain flat and at no point is the free length of the honeycomb forced out of the plane at any instant during the forming operation. During the rotational and translational movement which takes place in the expansion from the block to the conical or cylindrical form, every point originally in the plane of the free lengths of the honeycomb remains therein. The resultant object thus has increased strength in that the material has not been weakened by flexure.

A further feature of the invention is that the surface of the expanded shape forms an exact cone or cylinder and there is no necessity of machining the exterior in order to obtain the desired external characteristics. The axis of the expanded cone or cylinder is the exact geometrical axis of the object, free from any stress or strain.

Still another feature of the invention is the fact that the formation or the expanded shape takes place at the precise moment that the cells of honeycomb are fully expanded.

In the following description the laying out of the various laminae of an unexpanded block and of the glue areas and free (unglued) areas to provide the proper final shape for a cone is first described. It is then demonstrated that the laying out of a cylinder is merely a special case of the cone (i.e., the apex angle is zero). Formulae are devised whereby given the apex angle of the cone (zero in a cylinder), the radius at the base, and the desired cell size at some part of the object (e.g., at the base) all other necessary dimensions and positions may be determined. Thus a principal advantage of the invention is to facilitate the foregoing described method to produce the desired result.

Other objects of the present invention will become apparent upon reading the following specification and referring to the accompanying drawings in which similar characters of reference represent corresponding parts in each of the several views.

In the drawings:

FIG. 4 is a schematic view showing the mathematic development of a ribbon of FIG. 1;

FIG. 4a is an enlargement of a portion of FIG. 4;

FIG. 6 is a schematic perspective view showing the intersection of a plane tangent to a cell of the cone of FIG. 3;

FIG. 7 is a view similar to FIG. 6 of a plane tangent to a cell of a cylinder and illustrating that the cylinder is a degenerate case of a cone;

Figure 3:
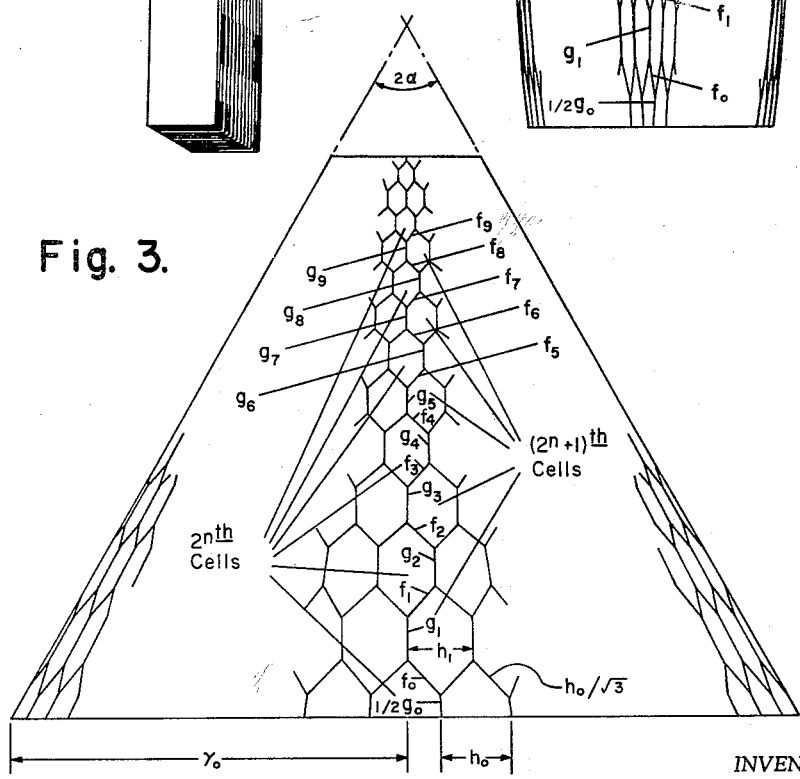
FIG. 3 is a schematic elevational view of a cone expanded from the shape of FIG. 2.
Figure 9:
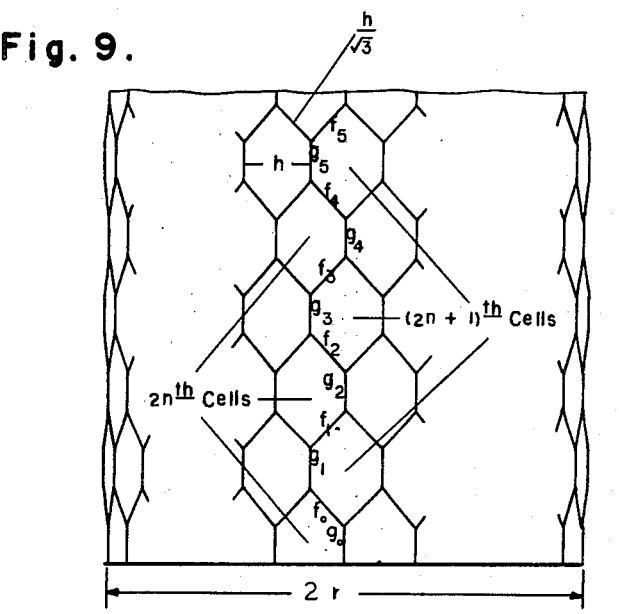
FIG. 9 is a view similar to FIG. 3 of a cylindrical shape.
Figure 10:
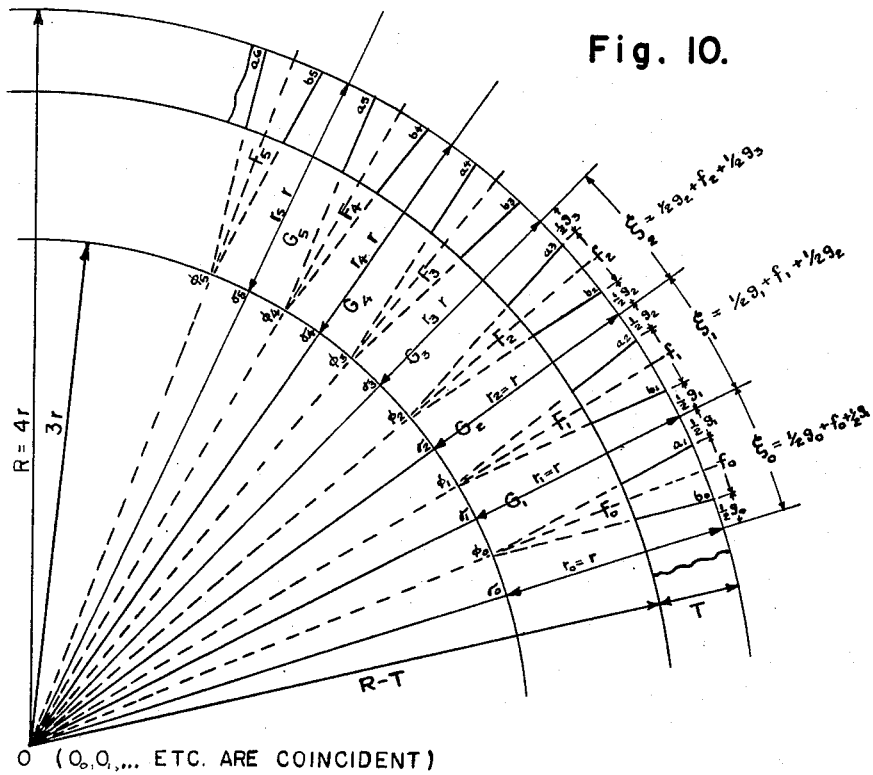
FIG. 10 is a view similar to FIG. 4 of a cylindrical shape.
Figure 10A:
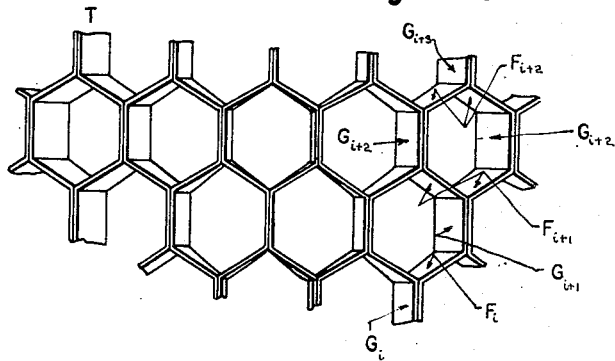
FIG. 10a is an enlarged schematic perspective view of a portion of a conical or cylindrical figure in accordance with this invention.
Figure 11:
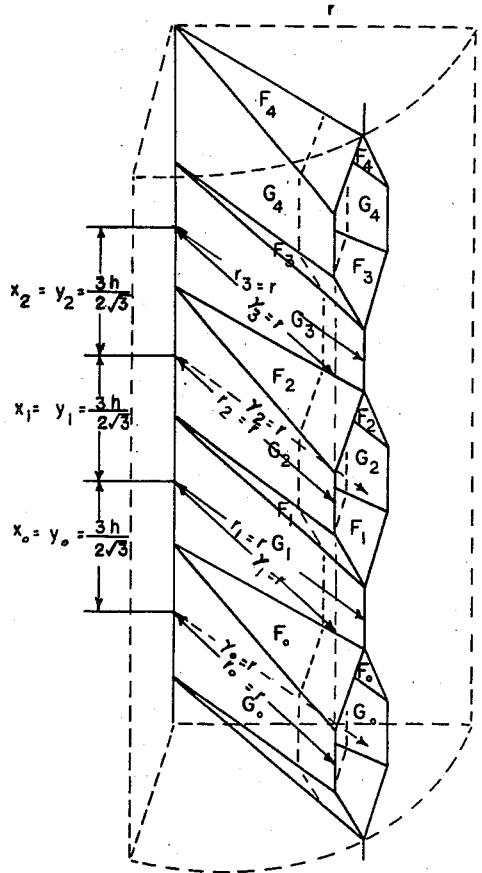
FIG. 11 is a view similar to FIG. 5 for a cylinder.
Figure 11A:
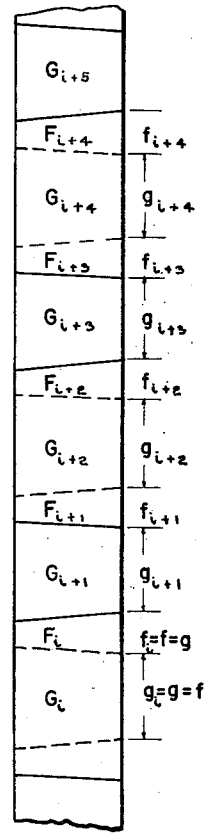
FIG. 11a is a view similar to FIG. 4a for a cylinder.
Figure 11B:
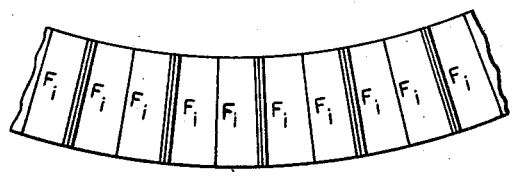
FIG. 11b is a fragmentary horizontal section through a cylinder in accordance with this invention.

Turning now to FIGS. 3 and 9 of the accompanying drawings:

Each honeycomb cell has a size on the outer surface of the expanded shape which is denominated herein "$h$," and is the distance between two opposite cell sides. This is the distance in a cell between the glue or bond planes. Similarly, the distance between the glue planes of adjacent ribbons of material in a given cell is $h/2$. By mathematical computation, it will be seen that the length of each side is $h/\sqrt{3}$.

This cell size obtains for all cells in the expanded honeycomb in final cylindrical shape, but for a cone obtains only at the base. The dimension "$h$" is the maximum dimension, it being understood that each of the cells tapers somewhat inwardly, and hence that the distance between sides at the inside of the cell is less than at the outside.

*Geometrical analysis of the conical shape*

Let:

$i$ = any integer, such as 1, 2, 3

Figure 5:
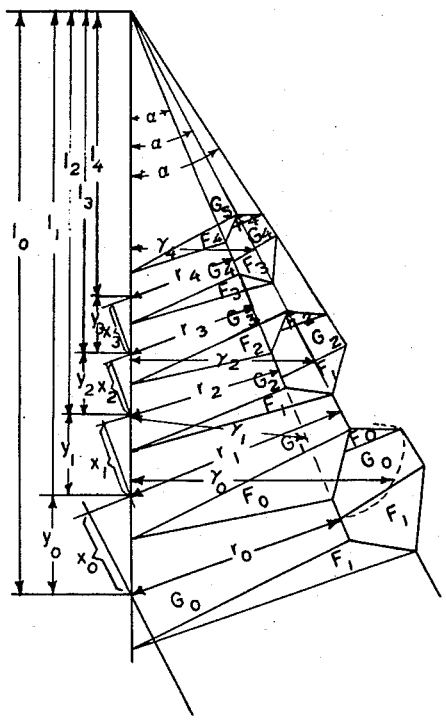
FIG. 5 is a schematic, partially perspective view showing a mathematical analysis of the cone of FIG. 3.
Figure 5A:
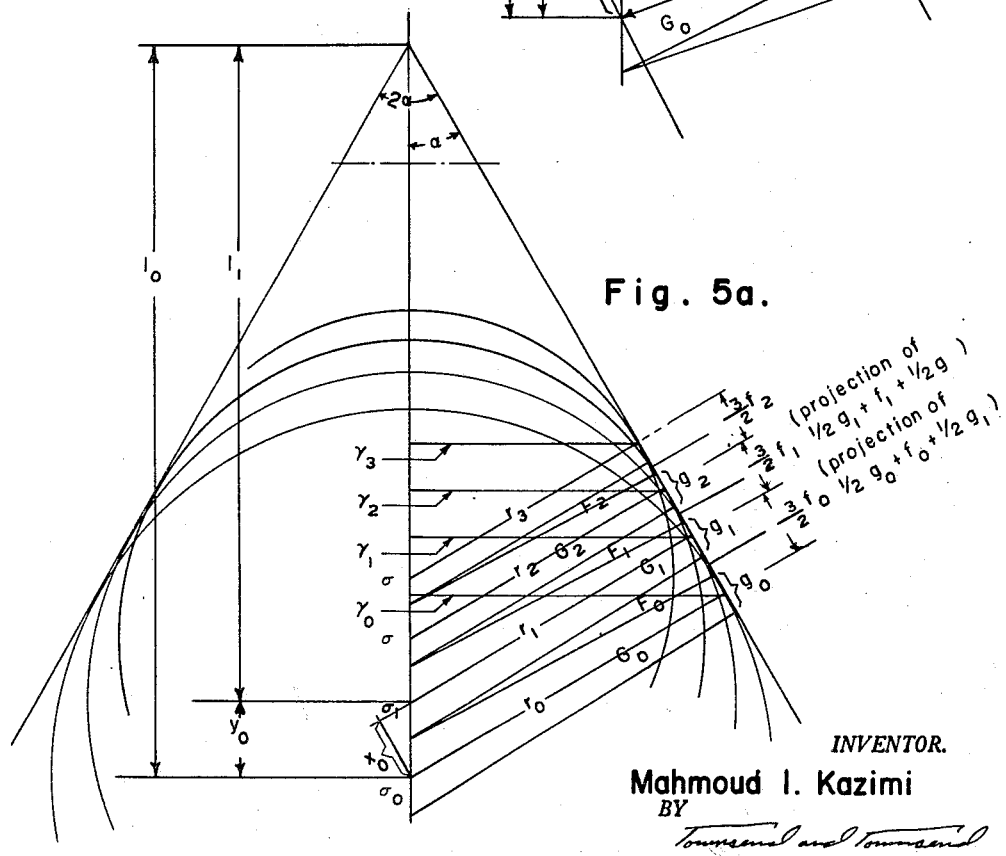
FIG. 5a is a vertical midsection through the cone of FIG. 5.
Figure 8:
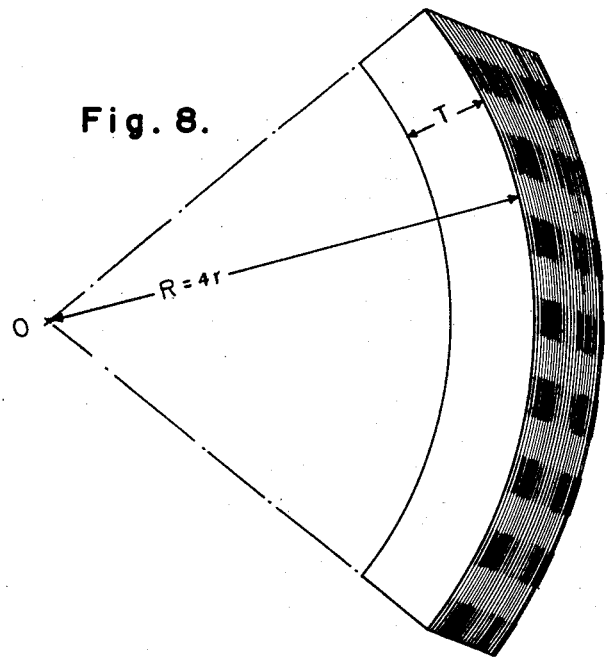
FIG. 8 is a view similar to FIG. 1 for a cylindrical shape.

$\alpha$ = half the apex angle of the cone (FIGURES 3, 5, 5a)

$\gamma_0$ = radius of the base of the cone (FIGURES 3, 5)

$\gamma_i$ = radius of the section at the $i$th cell $r_i$ = radius of the tangent sphere inside the cone that is tangent at the circle on the cone containing the $i$th cells (FIG. 5a)

The $i$th cells are counted from the base of the cone; the 0th cell is the cell that is evenly divided by the base of the cone. Followed by 1st cell, then the second, etc. (FIGURES 5, 5a).

$r_0 = \gamma_0/\cos \alpha$
$r_1 = \gamma_1/\cos \alpha$
$r_2 = \gamma_2/\cos \alpha$ etc. (FIGURES 5–5a)

$l_0$ is the distance on the axis of the cone from the point of intersection of $r_0$ to the apex (FIGURES 5, 5a).

Figure 2:
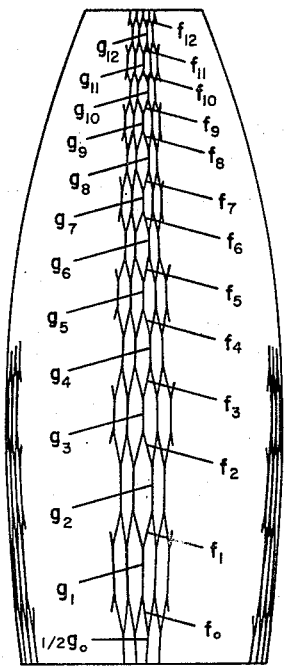
FIG. 2 is a schematic elevational view of the figure produced by bonding the top and bottom ribbons of the block of FIG. 1 as an intermediate step in the expansion method.

$l_0 = r_0/\sin \alpha$
$l_1 = r_1/\sin \alpha$
$l_2 = r_2/\sin \alpha$ etc.
$l_i = r_i/\sin \alpha$ The cells are named (FIGURES 2 and 3) 0th, 2nd, 4th, . . ., the $i$th (=2$n$th where $n$ is an integer) on one side of a ribbon of the cone, and 1st, 3rd, 5th, . . ., the $i$th (=2$n$+1)th where $n$ is an integer) on the other side of the ribbon from the even numbered cells. The two sets of cells, taken alternately form a zig-zag ladder of cells. Its steps are are the corrugations of the ribbon.

$\{G_0, G_2, G_4 \ldots, G_{2n}, \ldots\}$ (FIGURE 5) is the set of glue, bonding, adhesion (or whatever form of attachment needed) areas on one side of a given ribbon that joins one given ribbon to a succeeding ribbon.

$\{G_1, G_3, G_5, \ldots, G_{2n+1}, \ldots\}$ (FIGURE 5) is the set of glue, bonding, adhesion (or whatever form of attachment needed) areas on the other side of a given ribbon that joins the given ribbon to a preceding ribbon.

$\{F_0, F_1, F_2, \ldots, F_i, \ldots\}$ (FIGURE 5) is the set of free areas (free here means the opposite or not of the nature of the sets of $G_i$).

The various areas $F_i$ and $G_i$ consume the total ribbon in a cone in the following order:

$F_0$ is between $G_0$ and $G_1$ (FIGURE 5)
$F_1$ is between $G_1$ and $G_2$
$F_2$ is between $G_2$ and $G_3$
$F_i$ is between $G_i$ and $G_{i+1}$ $\{f_0, f_1, f_2, \ldots, f_i, \ldots\}$ (FIGURES 3, 2) is the set of free lines: the intersection of the set $\{F_0, F_1, \ldots, F_i, \ldots\}$ with the surface of the cone.

$\{g_0, g_2, \ldots, g_{2n}, \ldots\}$ (FIGURES 5a, 3, 2) is the set of glue lines defined by the intersection of the set $\{G_0, G_2, \ldots, G_{2n}, \ldots\}$ with the surface of the cone.

$\{g_1, g_3, g_5, \ldots, g_{2n+1}, \ldots\}$ (FIGURES 5a, 3, 2) is the set of glue lines defined by the intersection of the set $\{G_1, G_3, G_5, \ldots G_{2n+1}, \ldots\}$ with the surface of the cone.

$\gamma_0, \gamma_1, \gamma_2$, etc. (FIGURE 5a) are the radii of the base of the section of the cone at the spheres where radii are $r_0, r_1, r_2$, etc.

$l_0, l_1, l_2$, etc. (FIGURES 5, 5a) are heights of the apex from the centers of the spheres with radii $r_0, r_1, r_2$, etc.

$y_0$ is the distance measured along the axis of the cylinder between the centers of spheres $r_0$ and $r_1$.

$y_1$ is the distance measured along the axis of the cylinder between the centers of spheres $r_1$ and $r_2$, etc.

$x_0$ = projection of ($\frac{1}{2}g_0$, $f_0$, $\frac{1}{2}g_1$) on the plane containing $g_0, g_2, g_4$, etc., and the axis of the cone.

$x_i$ = projection of ($\frac{1}{2}g_i$, $f_i$, $\frac{1}{2}g_{i+1}$) on the plane containing $g_i, g_{i+2}, g_{i+4}$, etc., and the axis of the cone.

Let:

$\frac{1}{2}g_0 + \frac{1}{2}g_1 = f_0$
$\frac{1}{2}g_1 + \frac{1}{2}g_2 = f_1$
$\frac{1}{2}g_2 + \frac{1}{2}g_3 = f_3$, etc.

Then:

$x_0 = \frac{3}{2}f_0$
$x_1 = \frac{3}{2}f_1$
$x_2 = \frac{3}{2}f_2$
$x_i = \frac{3}{2}f_i$ And:

$y_0 = \frac{3}{2}f_0/\cos \alpha$
$y_1 = \frac{3}{2}f_1/\cos \alpha$
$y_i = \frac{3}{2}f_i/\cos \alpha$
$l_1 = l_0 - y_0$
$l_2 = l_1 - y_1$
$l_{i+1} = l_i - y_i$, etc. (FIGURES 5, 5a)
$\gamma_1/\gamma_0 = l_1/l_0$, then $\gamma_1 = \gamma_0 \cdot l_1/l_0$
$f_0/\gamma_0 = f_1/\gamma_1 = f_2/\gamma_2 = f_i/\gamma_i = k$ (constant) expressed in radians $f_0 = h_0/\sqrt{3}$
$k = h_0/(\gamma_0\sqrt{3})$ radians $k$ is a constant determined by the angle between two consecutive planes, the first containing the set $\{G_0, G_2, \ldots, G_{2n}, \ldots\}$ and the second containing the set $\{G_1, G_3, G_5, \ldots, G_{2n+1}, \ldots\}$. The two consecutive planes meet at the axis of the cone and contain a solid angle that can be measured in radians as "$k$" (FIGURE 5).

$$f_1/f_0 = \gamma_1/\gamma_0 = l_1/l_0; \quad \frac{r_0}{l_0} = \sin \alpha \text{ and } \frac{\gamma_0}{r_0} = \cos \alpha$$

Hence $$\frac{\gamma_0}{l_0} = \sin \alpha \cos \alpha \text{ or } l_0 = \frac{\gamma_0}{\sin \alpha \cos \alpha}$$

$$f_1 = f_0 \cdot l_1/l_0$$
$$= f_0 \cdot \frac{l_0 - y_0}{l_0}$$
$$= f_0 \left(l - \frac{3f_0}{2l_0 \cos \alpha}\right)$$
$$= f_0 \left(l - \frac{3f_0 \sin \alpha \cos \alpha}{2\gamma_0 \cos \alpha}\right)$$
$$= f_0 \left(l - \frac{3f_0 \sin \alpha}{2\gamma_0}\right)$$
$$= f_0 \left(l - \frac{3k \sin \alpha}{2}\right)$$

The above is valid since:

$$\gamma_0/r_0 = \cos \alpha; \quad r_0/l_0 = \sin \alpha$$
$$\gamma_0/l_0 = \sin \alpha \cos \alpha \text{ and } \gamma_0 = f_0/k$$
$$f_1 = f_0\left(1 - \frac{3k \sin \alpha}{2}\right)$$
$$= f_0(1-K) \text{ where } K = \frac{3k \sin \alpha}{2}$$

$$f_2 = f_1(1-K)$$
$$f_3 = f_2(1-K)$$
$$f_{i+1} = f_i(1-K)$$

etc. or $$f_0 = f_0(1-K)^0$$
$$f_1 = f_0(1-K)^1$$
$$f_2 = f_0(1-K)^2$$
$$f_3 = f_0(1-K)^3$$
$$f_4 = f_0(1-K)^4$$
$$f_i = f_0(1-K)^i$$

This means that once $\alpha$ (half the apex angle) is known and the cell size at a certain location (for convenience at the base) is known, then $k$ and $f_0$ and K are also known which allows for the calculation of $f_1, f_2, \ldots, f_i$, etc. Then the $g$'s can be calculated (with a good approximation) as $$g_1 = \tfrac{1}{2}(f_0+f_1) = \tfrac{1}{2}f_0(2-K)(1-K)^0$$
$$g_2 = \tfrac{1}{2}(f_1+f_2) = \tfrac{1}{2}f_0(2-K)(1-K)^1 \text{ etc.}$$
$$g_{i+1} = \tfrac{1}{2}(f_i+f_{i+1}) = \tfrac{1}{2}f_0(2-K)(1-K)^i$$

Hence, given $\alpha$, $f_0$, $\gamma_0$; K can be calculated which yields all the values needed for the sets $\{f_i\}$ and the sets $\{g_i\}$.

This information is used in plotting the unexpanded form of the honeycomb.

To be able to design the glue areas and free areas and the shape of the unexpanded form of the conical honeycomb, we must know the following:

(1) Apex angle of required cone ($2\alpha$).
(2) The radius of the base of the cone ($\gamma_0$).
(3) The cell size at the base of the cone ($h_0$). (Any cell size on the surface of the cone could be used as a basis; the selection of the cell size $h_0$ at the base is only a matter of convenience.) 1 and 2 will give the height to the apex of the cone.

From the given cell size $h_0$ at the base $g_0$ and $f_0$ can be calculated. $h_0$ implies the values of $g_0$ and $f_0$.

To rationalize the shape of the unexpanded form of the conical honeycomb the following reasoning can be used:

Imagine that the element at the base (composed of $\tfrac{1}{2}G_0+F_0+\tfrac{1}{2}G_1$ or the intersection of this element with the surface of the cone $\tfrac{1}{2}g_0+f_0+\tfrac{1}{2}g_1$) will take a reverse step from expanded form to unexpanded form. Then (FIG. 5a) the two radii of the two spheres contacting the cone at the middle of $g_0$ and the middle of $g_1$ will at the limit (i.e., when $G_0$, $F_0$ and $G_1$ are in the same plane), meet at a point $O_0$ (see FIG. 4). The distance from the middle of $g_0$ to $O_0$ is equal to $4r_0$ (see second sentence following). Similarly, for the element composed of $\tfrac{1}{2}G_1+F_1+\tfrac{1}{2}G_2$, in the limiting case, the extension of $r_1$ and $r_2$ will meet at a point $O_1$ (FIG. 4).

Originally (in the expanded form) (FIG. 5) $r_0$ and $r_1$ are parallel, the projection of $\tfrac{1}{2}g_0$, $f_0$, $\tfrac{1}{2}g_1 = x_0 = \tfrac{3}{2}f_0$; but in the unexpanded form $\tfrac{1}{2}g_0+f_0+\tfrac{1}{2}g_1 = 2f_0$ and $r_0$ and $r_1$ are no longer parallel, but will meet at a point $O_0$. The distance from the middle of $g_0$ or the middle of $g_1$ to $O_0$ ratioed to the distance from the middle of $g_0$ to $x_0$ ($=r_0$) is as $2f_0$ to $(2f_0-3f_0/2)$ which is equal to 4. Hence, distance from middle $g_1$ to $O_0=4r_0$ (FIG. 4); and the distance from the middle of $g_2$ to $O_2=4r_2$ (FIG. 4); the distance from the middle of $g_1$ to $O_1=4r_1$; etc.

Since $$r_0 = \gamma_0/\cos \alpha$$
$$r_1 = \gamma_1/\cos \alpha$$
$$r_1 = \gamma_1/\cos \alpha$$

then $$r_0/r_1 = \gamma_0/\gamma_1$$

but $$\gamma_0 = f_0/k$$
$$\gamma_1 = f_1/k$$
$$= f_0(1-K)/k$$

hence $$r_0/r_1 = f_0/k \div \frac{f_0(1-K)}{k} = \frac{1}{1-K}$$
$$r_1 = r_0(1-K)$$

Also $$r_0/r_2 = \gamma_0/\gamma_2$$

but $$\gamma_2 = f_2/k$$
$$= f_0(1-K)^2 \div k$$

hence $$r_0/r_2 = f_0/k \div \frac{f_0(1-K)^2}{k} = \frac{1}{(1-K)^2}$$
$$r_2 = r_0(1-K)$$

Or in general:

$$r_1 = r_0(1-K)^1$$
$$r_2 = r_0(1-K)^2 = r_1(1-K)$$
$$r_3 = r_0(1-K)^3 = r_2(1-K)$$
$$r_4 = r_0(1-K)^4 = r_3(1-K)$$
$$r_{i+1} = r_0(1-K)^{i+1} = r_i(1-K)$$

K is a numerical value less than one and positive. Hence $(1-K)$ is less than one and $(1-K)^2$ less than $(1-K)$, $(1-K)^3$ less than $(1-K)^2$, etc.

Hence, $r_{i+1}$ is less than $r_i < \ldots < r_3 < r_2 < r_1 < r_0$.

Therefore, the outer edge of the unexpanded core forms a spiral and the shape of the unexpanded honeycomb core will be similar to that in FIGURE 4.

*Plotting a print of an unexpanded conical core (FIG. 4)*

With $O_0$ as a center, draw an arc of a circle with a radius $R_0=4r_0$, ($r_0=\gamma_0/\cos \alpha$ where $\gamma_0$ is the radius of the base of the required cone in its expanded form and $\alpha$ is half its apex angle). On this arc locate the middle of $g_0$ and the middle of $g_1$; the arc length from middle of $g_0$ to middle of $g_1$ being equal to $2f_0$.

Locate $O_1$ on $R_1$; $O_1$ is on the line joining the middle of $g_1$ and $O_0$ but at a distance from the middle of $g_1$ equal to $4r_1=4r_0(1-K)$, with $r_0$ and $K$ being known. With $O_1$ as a center and with a radius equal to $$4r_1=R_1=4r_0(1-K)$$

draw an arc of a circle continuing from the middle of $g_1$ to the middle of $g_2$. The arc length from the middle of $g_1$ to the middle of $g_2=\frac{1}{2}g_1+f_1+\frac{1}{2}g_2=2f_1=2f_0(1-K)$. $f_0$ and $K$ are again known. Locate the middle of $g_2$ and on the line joining the middle of $g_2$ to $O_1$, locate $O_2$; the distance from the middle of $g_2$ to $O_2$ is equal to $$4r_2=R_2=4r_0(1-K)^2$$

Then with $O_2$ as a center and $R_2$ as a radius draw (continue) the arc from the middle of $g_2$ to the middle of $g_3$; the arc length at this stage is equal to $$\tfrac{1}{2}g_2+f_2+\tfrac{1}{2}g_3=2f_2=2f_0(1-K)^2$$

In general, with $O_i$ as a center and $R_i$ as a radius, we continue the arc from the middle of $g_i$ to the middle of $g_i+1$; the arc length at this stage is equal to:

$$\tfrac{1}{2}g_i+f_i+\tfrac{1}{2}g_{i+1}=2f_i=2f_0(1-K)^i$$

This same procedure can be followed until the total shape of the unexpanded form of the honeycomb core is plotted.

The second step in the layout of the unexpanded form is to determine the set of points $\{\sigma_0, \sigma_1, \sigma_2, \ldots, \sigma_i, \ldots\}$ such that the distance from the middle of $g_0$ to $\sigma_0$ on $R_0$ is $r_0$; the distance from $g_1$ to $\sigma_1$ on $R_1$ is equal to $r_1$; and in general the distance from the middle of $g_i$ to $\sigma_i$ on $R_i$ is equal to $r_i$, etc. This set of points $\{\sigma_0, \sigma_1, \sigma_2, \ldots, \sigma_i, \ldots\}$ is the set that will determine the curve (or locus) that will assume the axis of the expanded cone.

Let:

$$\xi_0=\tfrac{1}{2}g_0+f_0+\tfrac{1}{2}g_1$$
$$\xi_1=\tfrac{1}{2}g_1+f_1+\tfrac{1}{2}g_2$$
$$\xi_2=\tfrac{1}{2}g_2+f_2+\tfrac{1}{2}g_3$$
$$\xi_i=\tfrac{1}{2}g_i+f_i+\tfrac{1}{2}g_{i+1}$$

the set of arcs $\{\xi_0, \xi_1, \xi_2, \ldots, \xi_i, \ldots\}$ develops the outer limits of the unexpanded form of the conical honeycomb core. The shape of the outer limits will resemble an involute whose evolute is the locus of the set $\{O_0, O_1, O_2, \ldots, O_i\}$. The limits of $\xi_0$ are the middle points of $g_0$ and $g_1$; the limits of $\xi_1$ are the middle points of $g_1$ and $g_2$; ...; the limits of $\xi_i$ are the middle points of $g_i$ and $g_{i+1}$, etc.

Starting at outer edge of the unexpanded form (FIG. 4) and from the middle of $g_0$, measure on the arc $\xi_0$ a length equal to $\frac{1}{2}g_0$ thereby locating the point $b_0$. Then from $b_0$ measure the length $f_0$ on the rest of the arc $\xi_0$ and locate $a_1$. The rest of $\xi_0$ from $a_1$ to the middle of $g_1$ is $\frac{1}{2}g_1$. Locate $b_1$ on $\xi_1$, the length from $a_1$ to $b_1$ is equal to $g_1$. Then also on $\xi_1$, locate the point $a_2$; the arc length from $b_1$ to $a_2$ is $f_1$. In general (FIG. 4a), from $b_i$ on $\xi_i$ measure an arc length equal to $f_i$ to locate $a_{i+1}$ on $\xi_i$. Then from $a_{i+1}$ measure an arc length equal to $g_{i+1}$ to locate $b_{i+1}$ on $\xi_{i+1}$, etc.

Having located the two sets of points $\{b_0, b_1, b_2, \ldots, b_i, \ldots\}$ and $\{a_1, a_2, \ldots, a_{i+1}, \ldots\}$ to continue with the layout of the unexpanded form: Determine the boundaries of the glue areas and free areas. Determine the set of points $\phi_i$ where $i=0$ to $n$, such that $\phi_k$ are the middle points of the arc lengths $\sigma_k$ and $\sigma_{k+1}$ i.e., $\phi_0$ is the middle of the arc $\sigma_0\sigma_1$,
$\phi_1$ is the middle of the arc $\sigma_1\sigma_2$,
$\phi_2$ is the middle of the arc $\sigma_2\sigma_3$, etc.

Then join:

both $b_0$ and $a_2$ to $\phi_0$
both $b_1$ and $a_2$ to $\phi_1$
both $b_2$ and $a_3$ to $\phi_2$ In general, joint both $b_k$ and $a_{k+1}$ to $\phi_k$. This being done, the area bounded by $a_{k+1}$ $\phi_k$ $\phi_{k+1}$ $b_{k+1}$ determines a glue area, and the area bounded by $b_k$ $\phi_k$ $a_{k+1}$ determines a free area.

The following sets of areas will determine the upper and lower glue areas:

$a_1$ $\phi_0$ $\phi_1$ $b_1$
$a_3$ $\phi_2$ $\phi_3$ $b_3$ determine the boundaries of one group of glue areas (i.e., the upper glue areas on a flat unexpanded sheet).
$a_5$ $\phi_4$ $\phi_5$ $b_5$
etc.

$a_2$ $\phi_1$ $\phi_2$ $b_2$
$a_4$ $\phi_3$ $\phi_4$ $b_4$ determine the boundaries of the other group of glue areas (i.e., the lower glue areas on a flat unexpanded sheet).
$a_6$ $\phi_5$ $\phi_6$ $b_6$
etc.

These two sets of glue area boundaries on the same sheet will form (on the expanded core) two planes that contain the axis of the core and each group's plane will contain with the other group's plane, at axis of the cone, a solid angle. This solid angle is equal to $h_0/2\gamma_0$ radians, where $h_0$ is the cell size of the base cell and $h_0/2\gamma_0 = h_1/2\gamma_1 = h_2/2\gamma_2 = \ldots = h_i/2\gamma_i$.

The sets:

$b_0$ $\phi_0$ $a_1$
$b_2$ $\phi_2$ $a_3$
$b_4$ $\phi_4$ $a_5$
$b_6$ $\phi_6$ $a_7$ etc.

and, $b_1$ $\phi_1$ $a_2$
$b_3$ $\phi_3$ $a_4$
$b_5$ $\phi_5$ $a_6$
$b_7$ $\phi_7$ $a_8$ etc.

determine the boundaries for the free areas (free from bonding material). Each one of these two sets will form a group of parallel planes. The planes of each set are joined by the glue areas. The total sheet is consumed by the sets of glue and free areas.

To produce the conical shape, the sheets of material (such as paper, glass, fabric, aluminum foil, etc.) are cut to the size bounded by the two curves, the first formed by the set of arcs $\{\xi_0, \xi_1, \ldots, \xi_i, \ldots\}$ and the second by the set $\{\sigma_0, \sigma_1, \ldots, \sigma_i, \ldots\}$ and bounded by the two radii $R_0$ and $R_n$ (or to be exact by $r_0$ and $r_n$). Then glue areas can be applied on alternate sheets. The first set of glue areas $\{a_1$ $\phi_0$ $\phi_1$ $b_1$, etc.$\}$ are applied on the first group of the alternate sheets and the second set of glue areas $\{a_2$ $\phi_1$ $\phi_2$ $b_2$, etc.$\}$ are applied to the second group of the alternate sheets.

When this is done, and glue areas are completed, the unexpanded form will be expanded to give a full cone. The cone will have only one surface, namely the outer surface. But in most applications, it is desirable to have a conical shell rather than a solid core. This is accomplished by drawing a curve of constant distance (distance being equal to the desired thickness of the shell) from the curve formed by the outer edge of the unexpanded form. The required unexpanded form will then be bounded by this curve and the outer edge and by the two radii $R_0$ and $R_n$.

Figure 1:
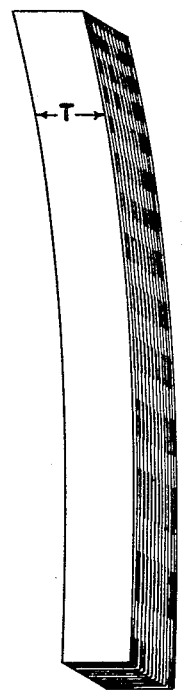
FIG. 1 is a perspective view of an unexpanded block of honeycomb constructed of a plurality of ribbons for ultimate expansion into a conical shape.

In unexpanded form the stack of sheets of material or ribbons as shown in FIG. 1 is defined by two substantially parallel plane surfaces which are parallel to the flat surfaces of the sheets of material and form the top and bottom of the stack and an inner and an outer curved surface conforming to the curves as set forth above. The inner and outer surfaces are single curvature surfaces, i.e., they are curved along the length of the ribbons or substantially in the direction of the axis of the figure but are not curved in a direction normal to the top and bottom plane surfaces. A plane tangent to the outer surface meets each of the ribbons in the stack at a single point, the totality of these points lying on a line perpendicular to the parallel bounding planes. Upon expansion the outer curved surface is transformed into the external conical surface and a plane tangent to the external conical surface contacts this external conical surface in a straight line which runs the length of the external surface and which lies within a plane containing the axis of the figure.

*Summary of the method of plotting the unexpanded form of the conical core*

Given:
$$\alpha$$
$$\gamma_0$$
$$h_0$$

Calculate
$$f_0 = h_0/\sqrt{3}$$
$$k = h_0/\gamma_0\sqrt{3} = f_0/\gamma_0$$
$$K = \frac{3k \sin \alpha}{2}$$

Then calculate $f_i$, $R_i$ and $g_i$ as follows:
$$f_i = f_0(1-K)^i$$
$$g_{i+1} = \frac{1}{2}f_0(2-K)(1-K)^i$$
$$R_i = \frac{4\gamma_0}{\cos \alpha}(1-K)^i$$
$$\xi_i = \frac{1}{2}g_i + f_i \frac{1}{2}g_{i+1}$$

Tabulate the results and use to plot the unexpanded form:

(A)

(1) Select a point $O_0$ on a straight line, locate the middle of $g_0$ on this straight line such that the distance from the middle of $g_0$ to $O_0$ is equal to $R_0$. Draw an arc with $O_0$ as center, $R_0$ as a radius and the middle of $g_0$ the start of the arc.

(2) From the middle of $g_0$ on the drawn arc measure an arc length equal to $\xi_0$ and locate the middle of $g_1$ such that the middle of $g_0$ and $g_1$ are the limits of $\xi_0$.

(3) Join the middle of $g_1$ with $O_0$ and on this line locate $O_1$ such that the distance from the middle of $g_1$ to $O_1$ is $R_1$. With $O_1$ as center and $R_1$ as a radius continue the arc length $\xi_0$ starting from the middle of $g_1$ to the middle of $g_2$ where the arc length between the middles of $g_1$ and $g_2$ is $\xi_1$, the end of $\xi_1$ is the middle of $g_2$.

(4) Continue the steps 1, 2, and 3 until the sets $\{\xi_0, \xi_1, \xi_2, \ldots, \xi_i, \ldots\}$; $\{O_0, O_1, O_2, \ldots, O_i, \ldots\}$; $\{R_0, R_1, R_2, \ldots, R_i, \ldots\}$ are located. This will also locate the set of the middle points of $\{g_0, g_1, g_2, \ldots g_i \ldots\}$.

(B)

(1) Locate the set of points $\{\sigma_0, \sigma_1, \sigma_2, \ldots, \sigma_i, \ldots\}$ on the set of $\{R_0, R_1, R_2, \ldots, R_i, \ldots\}$. The distance of $\sigma_i$ from the middle of $g_i$ is
$$r_i = r_0(1-K)^i = \frac{\gamma_0}{\cos \alpha}(1-K)^i$$

(2) Locate the set of the middles of $\sigma_i \sigma_{i+1}$ namely the set of points $\{\phi_0, \phi_1, \phi_2, \ldots, \phi_i, \ldots\}$.

(3) Subdivide the set of $\{\xi_0, \xi_1, \ldots \xi_i \ldots\}$ by the sets of points $\{b_0, b_1, b_2, \ldots, b_i, \ldots\}$ and $\{a_1, a_2, \ldots, a_{i+1}, \ldots\}$ such that the distance from the middle of $g_i$ to $b_i = \frac{1}{2}g_i = \frac{1}{4}f_0(2-K)(1-K)^{i-1}$ and the distance from $b_i$ to $a_{i+1} = f_i = f_0(1-K)^i$ and the distance of $a_{i+1}$ to the middle of $g_{i+1}$ (the rest of the arc $\xi_i$) is $= \frac{1}{2}g_{i+1} = \frac{1}{4}f_0(2-K)(1-K)^i$.

(C)

(1) Join $\phi_0$ to $b_0$ and $\phi_0$ to $a_1$. Join $\phi_1$ to $b_1$ and $\phi_1$ to $a_2$ and in general join $\phi_i$ to $b_i$ and $\phi_i$ to $a_{i+1}$. This will locate the sets of bounded glue areas $\{a_1 \phi_0 \phi_1 b_1 a_3 \phi_2 \phi_3 b_3, \ldots a_{2n+1} \phi_{2n} \phi_{2n+1} b_{2n+1}, \ldots\}$
and $\{a_2 \phi_1 \phi_2 b_2, a_4 \phi_3 \phi_4 b_4, \ldots, a_{2n} \phi_{2n-1} \phi_{2n} b_{2n}, \ldots\}$ and the sets of the bounded free areas $\{b_0 \phi_0 a_1, b_2 \phi_2 a_3, \ldots, b_{2n} \phi_{2n} a_{2n+1}, \ldots\}$
and $\{b_1 \phi_1 a_2, b_3 \phi_3 a_4, \ldots, b_{2n-1} \phi_{2n-1} a_{2n}, \ldots\}$ (2) Draw a curve similar to that of the set $\{\xi_i\}$ but at a distance from it equal to the required thickness of the conical shell. Cut the plot along these two curves and between $R_0$ and $R_n$ where $n$ determines the final cell at the limit near the apex.

(D)

Apply the bonding technique to either of the two sets of glue areas or alternately, depending on the technique used. Then expand to the conical shape.

To determine the length of the curve bounding the outer edge of the unexpanded form, use the following formulae:

$$\sum_{i=0}^{n} \xi_i = \frac{2f_0}{K}\{1-(1-K)^{n+1}\}$$

where $n$ is the last cell in the neighborhood of the apex.

$$\sum_{i=0}^{\infty} \xi_i = \frac{2f_0}{K}$$

The number of ribbons required for a given cone is approximately in accordance with the formula $$\frac{4\pi\gamma_0}{h_0}$$

as is apparent from the fact that the circumference at the base is $2\pi\gamma_0$ and that each ribbon contributes to said circumference an arcuate length $h_0/2$.

Since the number of ribbons determined by this formula is likely to be other than a prime number, one or two ribbons may be added to the prime number and the ultimate shape not quite fully expanded.

If, as is quite common in industry, only a segment of a cone (or cylinder) is required, the number of ribbons is proportional to the number in the complete figure at the same ratio as the required arcuate length of the segment is to the circumference of the complete figure. Further, the figure may be truncated, in which the length of each ribbon is proportionately shorter.

*Geometrical analysis of cylindrical core*

The cylindrical core is in essence a particular case of the conical core. In the case of a conical core, the apex angle $2\alpha$ has a magnitude that could take any value from 180° to 0°. Both 180° and 0° are in essence degenerate cases. The first forms a type of plane surface, while the second forms a cylinder. As $2\alpha$ approaches 0 while the base circle of the cone is held constant the point of intersection of the axis of the cone and the generating line of the surface of the cone moves upward further and further and in the limit the apex (or the point of intersection) is at infinity.

Expressed in other terms (when $2\alpha=0$) the generating line is a constant distance from a fixed axis parallel to it and rotating about it. The type of surface developed through such generating line about a given stationary axis is a cylinder. Hence, the development described in the conical core can be adapted to develop the cylindrical core.

*General formulas*

Recalling the general formula of the conical core and taking $\alpha=0$, then given $\gamma_0$ = radius of the (base of the) cylinder
$h_0$ = cell size (at the base)

then the following formulae are applicable both for cones and cylinders and are shown with the special values applicable to the degenerate case of cylinders applied.

$$k = h_0/\sqrt{3}\gamma_0 \text{ radians (constant)} \quad (1\text{-}a)$$
$$K = (3/2k) \sin \alpha = 0 \quad (2\text{-}a)$$
$$f_i = f_0(1-K)^i = f_0 \quad (3\text{-}a)$$
$$f_0 = h_0/\sqrt{3} \quad (4\text{-}a)$$
$$g_i = \tfrac{1}{2}f_0(2-K)(1-K)^i = f_0 \quad (5\text{-}a)$$
$$r_i = r_0(1-K)^i = r_0 \quad (6\text{-}a)$$
$$r_0 = \gamma_0/\cos \alpha = \gamma_0 \quad (7\text{-}a)$$
$$\gamma_i = f_0(1-K)^i/k = f_0/k \quad (8\text{-}a)$$
$$R_i = 4r_i = 4\gamma_0/\cos \alpha \, (1-K)^i = 4\gamma_0 \quad (9\text{-}a)$$
$$\xi_i = \tfrac{1}{2}g_i + f_i + \tfrac{1}{2}g_{i+1} = 2f_0 \quad (10\text{-}a)$$

$$\sum_{i=0}^{m} \xi_i = 2mf_0 = \frac{2mh_0}{\sqrt{3}} \quad (11\text{-}a)$$

$$\sum_{i=0}^{\infty} \xi_i = \infty \quad (12\text{-}a)$$

$$R_i - R_{i+1} = 3\xi_i \tan \alpha = 0 \quad (13\text{-}a)$$

Formulas 3-a, 4-a and 5-a affirm the fact that the glue and the free lengths $g_i$ and $f_i$ on the surface of the cylinder are identical and constant and equal to $h_0/\sqrt{3}$, i.e.

$$f_i = g_i = h_0/\sqrt{3} \quad (14\text{-}a)$$

Formulas 1-a, 6-a, 7-a and 8-a affirm the fact that $$r_i = \gamma_i = \gamma_0 \quad (15\text{-}a)$$

Formula 9-a or 13-a indicate that in the development of the cylindrical unexpanded shape the radii $R_i$ are all identical and have a common point of origin $O_0$ (i.e. $O_i$ are all coincident). To be more explicit (9-a) and (13-a) indicate that the outer edge of the unexpanded shape of the cylindrical core is circular (a part of a circle).

*Method of plotting the unexpanded form of the cylindrical core*

Following similar steps to those developed for the conical core and using the degenerate form of the general Formulae 1-a to 15-a, we get:

Given
$$\gamma_0 \text{ and } h_0$$

Calculate
$$f_0 = h_0/\sqrt{3}$$
$$k = f_0/\gamma_0$$

Then
$$f_i = g_i = f_0 \quad \text{by (14-a)}$$
$$R_i = 4\gamma_0 \quad \text{by (9-a)}$$

(A)

(1) Select a point $O_0$ on a straight line, locate the middle of $g_0$ on this straight line such that the distance from the middle of $g_0$ to $O_0$ is equal to $R_0$. Draw an arc with $O_0$ as center, $R_0$ as a radius and the middle of $g_0$ the starting point. The arc in this cylindrical core case could be extended to at least contain a length equal to $2mf_0$ when $m$ is the number of cells needed for the cylinder counted from the base to the top of the cylinder (method of cell counting being the same as that outlined in the development of the conical core).

(2) From the middle of $g_0$ on the drawn arc measure an arc length equal to $\xi_0 = 2f_0$ (by 10-a) and locate the middle of $g_1$ such that the middle of $g_0$ and $g_1$ are the limits of $\xi_0 (=2f_0)$.

(3) Join the middle of $g_1$ with $O_0$; then from the middle of $g_1$ on the circular arc drawn measure an arc length equal to $\xi_1 (=2f_0)$ and locate the middle of $g_2$ such that the middles of $g_1$ and $g_2$ are the limits of $\xi_1$.

(4) Continue the steps 1, 2, and 3 until the sets $$\{\xi_0, \xi_1, \xi_2, \ldots, \xi_i, \ldots \xi_m\}$$
$$\{R_0, R_1, R_2, \ldots, R_i, \ldots R_m\}$$

are located. This will also locate the set of middle points of $\{g_0, g_1, g_2, \ldots, g_i, \ldots g_m\}$.

(B)

(1) Locate the set of points $\{\sigma_0, \sigma_1, \sigma_2, \ldots, \sigma_i, \ldots \sigma_m\}$ on the set of $\{R_0, R_1, R_2, \ldots, R_i, \ldots\}$. The distance of $\sigma_i$ from the middle of $g_i$ is $r_i = r_0 = \gamma_0$ (by 6-a and 7-a).

(2) Locate the set of middles of $\sigma_i, \sigma_{i+1}$, namely the set of points $\{\phi_0, \phi_1, \phi_2, \ldots, \phi_i, \ldots \phi_m\}$.

(3) Subdivide the set of $\{\xi_0, \xi_1, \xi_2, \ldots, \xi_i, \ldots\}$ by the sets of points $\{b_0, b_1, \ldots, b_i, \ldots b_m\}$ and $\{a_1, a_2, a_3, \ldots, a_{i+1}, a_{m+1}\}$ such that the distance from the middle of $g_i$ to $b_i = \tfrac{1}{2}g_i = \tfrac{1}{2}f_0$ and the distance from $b_i$ to $a_{i+1} = f_i = f_0$ and the distance of $a_{i+1}$ to the middle $g_{i+1}$ (the rest of $\xi_i$) = $\tfrac{1}{2}g_{i+1} = \tfrac{1}{2}f_0$.

(C)

(1) Join $\phi_0$ to $b_0$ and $\phi_0$ to $a_1$. Join $\phi_1$ to $b_1$ and $\phi_1$ to $a_2$ and in general join $\phi_i$ to $b_i$ and $\phi_i$ to $a_{i+1}$. This will locate the sets of bounded glue areas.

$$\{a_1 \; \phi_0 \; \phi_1 \; b_1, \; a_3 \; \phi_2 \; \phi_3 \; b_3, \; \ldots, $$
$$a_{2n+1} \; \phi_{2n} \; \phi_{2n+1} \; b_{2n+1}, \ldots\}$$

and $$\{a_2 \; \phi_1 \; \phi_2 \; b_2, \; a_4 \; \phi_3 \; \phi_4 \; b_4, \; \ldots, $$
$$a_{2n} \; \phi_{2n-1} \; \phi_{2n} \; b_{2n}, \ldots\}$$

and the sets of the bounded free areas $$\{b_0 \; \phi_0 \; a_1, \; b_2 \; \phi_2 \; a_3, \; \ldots, \; b_{2n} \; \phi_{2n} \; a_{2n+1}, \ldots\}$$

and $$\{b_1 \; \phi_1 \; a_2, \; b_3 \; \phi_3 \; a_4, \; \ldots, \; b_{2n-1} \; \phi_{2n-1} \; a_{2n}, \ldots\}$$

(2) Draw a curve similar to that of the set of $\{\xi_i\}$ (i.e. a circle with center $O_0$) but at a distance from it equal to the required thickness of cylindrical shell. Cut the plot along these two curves and between $R_0$ and $R_m$, where $m$ locates the final cell at upper edge of the cylindrical core.

(D)

Apply the bonding technique to either both of the two sets of glue areas or alternate, depending on the technique used. The final expanded form yields the required cylindrical shell.

In the appended claims, certain terms are used which should be understood to have the following meanings:

"Conical shape" includes both cylindrical and conical;

"Bond area" is the area of a ribbon which is, or is intended to be, glued, welded, brazed, soldered, mechanically attached, or in any other manner adhered or affixed to the bond area of an adjacent ribbon;

"Free area" is all area of a ribbon other than a bond area.

Although the present invention has been described in some detail by way of illustration and example for purposes of understanding, it is understood that numerous other changes and modifications may be practiced within the spirit of the invention as limited only by the scope of the claims appended hereto.

What is claimed is:

1. A solid figure having an external surface of a conical shape and comprising a plurality of honeycomb cells, each cell being defined by ribbons of material, each ribbon having alternate bond areas and free areas and wherein the bond areas of adjacent ribbons are juxtaposed and bonded together and wherein the axis of symmetry of each said cell is perpendicular to a plane tangent to said external surface at the intersection of said axis with said surface, and wherein in all ribbons all alternate bond areas of an expanded ribbon lie in one plane containing the axis of said shape.

2. A figure according to claim 1 wherein the walls of each said cell are substantially flat converging planes and the lineal dimensions of each said cell at the inside of said cell are shorter than the corresponding lineal dimensions of each said cell at the outside of said cell, said converging planes converging inwardly of the shape.

3. A solid figure having an external surface of a conical shape and comprising a plurality of honeycomb cells; each said cell being defined by ribbons of material; each ribbon having alternate bond areas and free areas; certain alternate bond areas of adjacent ribbons being juxtaposed and bonded together; the axis of symmetry of each said cell being perpendicular to a plane tangent to said external surface at the intersection of said axis with said surface; in all ribbons all of the alternate bond areas of an expanded ribbon lying wholly within one plane containing the axis of said shape; and said figure formed from expansion of a stack of substantially flat ribbons of material having said alternate bond areas and free areas and wherein each ribbon has a curved edge which, upon expansion of said stack of ribbons, serves to define a portion of said conically shaped external surface.

4. A figure having an external surface of a conical shape and comprising a plurality of ribbons, each ribbon having alternate bond areas and free areas and wherein the bond areas of adjacent ribbons are juxtaposed and bonded together; said ribbons defining a plurality of honeycomb cells; each of said cells having an axis of symmetry which is perpendicular to a plane tangent to said external surface at the intersection of said axis with said surface; in all ribbons all alternate bond areas of an expanded ribbon lying in one plane containing the axis of said figure; said solid figure having been formed by expansion of the stack of ribbons, substantially every ribbon being bonded on its obverse and reverse faces to the adjacent ribbons by said bond areas with the bond areas on said reverse face of a ribbon disposed in staggered parallel relationship to the bond areas on said obverse face, said stack being defined by two substantially parallel plane surfaces and inner and outer single curvature surfaces such that a plane tangent to the outer of said surfaces meets every ribbon in said stack at a single point, the totality of said points lying on a line perpendicular to said parallel plane surfaces and such that upon expansion of said stack of ribbons a plane tangent to said external surface contacts no more than two ribbons at points lying in a straight line running substantially the length of said external surface and contained in a flat plane with the axis of said figure.

5. A solid figure of the group having external conical and cylindrical surfaces and comprising a plurality of regularly arranged honeycomb cells defined by a plurality of ribbons having bond areas and free areas and wherein the angle of said cone between the axis of symmetry and the generating line of said surface is $\alpha$, the radius of the base of said cone is $\gamma_0$ and the cell size at said base is $h_0$; each said ribbon developed in a flat plane having an outer edge of surved shape made of a plurality of short circular arcs; the arc of the base cell having a point $O_0$ as center and a radius $R_0=4r_0$, where $r_0=\gamma_0/\cos\alpha$, said arc having located thereon a length from the middle of $g_0$ to the middle of $g_1$, where $g_0=$ is a line defined by the intersection of the bond area of the base cell with said surface, and
$g_1=$ is a line defined by the intersection of the bond area of the first cell above base cell with said surface; and wherein the length of $g_0$ is determined by the formula:

$$g_{i+1}=\tfrac{1}{2}f_0(2-K)(1-K)^i$$

where
$f_0$ is the length of the free area of the base cell and wherein $$K=3k\sin\alpha/2$$

and $$k=h_0/\gamma_0\sqrt{3}$$

the arc of the cell above the base cell having point $O_1$ as center located on the line joining the middle of $g_1$ and $O_0$ at a distance from the middle of $g_1$ equal to $$4r_0(1-K)$$

where $$r_0=\gamma_0/\cos\alpha$$

said arc of the cell above the base cell having a radius $R_1=4r_0$, and having a length between the middle of $g_1$ and the middle of $g_2$ defined by the general formula $$2f_0(1-K)^i$$

6. A solid figure according to claim 5 of cylindrical shape wherein $\alpha=0$ and wherein all cell sizes are the same and the radius of each cell is the same.

7. A solid figure according to claim 5 of conical shape wherein $\alpha$ is greater than 0 and wherein the cell sizes decrease from base to apex and the radii of the cells decrease from base to apex but for all cells lying on the same layer transverse to the axis of symmetry the cell sizes are the same and the radius of each cell is the same.

8. A method of forming an individual ribbon for a conical core in unexpanded form for a solid figure having an external conical surface and comprising a plurality of regularly arranged honeycomb cells defined by a plurality of ribbons having bond areas and free areas and wherein:

$\alpha$ is the angle between the axis of symmetry of said surface and the generating line of said surface,
$\gamma_0$ is the radius of the base of said surface, and
$h_0$ is the cell size at said base and
$\tau$ is the wall thickness and wherein:
$f_0=h_0/\sqrt{3}$,
$k=h_0/\gamma_0\sqrt{3}=f_0/\gamma_0$
$K=3k\sin\alpha/2$ and wherein by calculation are determined $$f_i=f_0(1-K)^i$$
$$g_{i+1}=\tfrac{1}{2}f_0(2-K)(1-K)^i$$

$$R_i=\frac{4\gamma_0}{\cos\alpha}(1-K)^i$$

$$\xi=\tfrac{1}{2}g_i+f_i+\tfrac{1}{2}g_{i+1}$$

the steps of said method comprising first, select a point $O_0$ on a straight first line and locate on said first line the middle of $g_0$ such that the distance from the middle of $g_0$ to $O_0=R_0$ and draw a first arc with $O_0$ as center, $R_0$ as radius and the middle of $g_0$ as the start of said arc;

second, from the middle of $g_0$ on said first arc measure an arc length $\xi$ to locate the middle of $g_1$;

third, draw a second line joining the middle of $g_1$ to $O_0$ and on said second line locate $O_1$ at a distance $R_1$ from the middle of $g_1$ and with $O_1$ as center and $R_1$ as radius draw a second arc from the middle of $g_1$ to the middle of $g_2$ with an arc length $\xi_1$;

fourth, repeat steps one to three to locate the set of the middle points $\{g_0, g_1, g_2 \ldots g_i, \ldots\}$ fifth, on the set $\{R_0, R_1, R_2, \ldots R_i \ldots\}$ locate the set of points $\{\sigma_0, \sigma_1, \sigma_2, \ldots \sigma_i, \ldots\}$ wherein the distance of $\sigma_i$ from the middle of $g_i$ is determined by the formula:

$$R_i=\frac{\gamma_0}{\cos\alpha}(1-K)^i$$

sixth, locate the set of points $\{\phi_0, \phi_1, \phi_2, \ldots \phi_i, \ldots\}$ at the middles of the lengths $\sigma_i, \sigma_{i+1}$;

seventh, subdivide the set $\{\xi_0, \xi_1, \ldots \xi_i \ldots\}$ by the sets of points $\{b_0, b_1, b_2 \ldots b_i \ldots\}$ and $\{a_1, a_2, \ldots a_{i+1}, \ldots\}$ such that the distance from the middle of $g_i$ to $b_i=\tfrac{1}{2}g_i=\tfrac{1}{4}f_0(2-K)(1-K)^{i-1}$ and the distance from $b_i$ to $a_{i+1}=f_i=f_0(1-K)^i$ and the distance from $a_{i+1}$ to the middle of $g_{i+1}=\tfrac{1}{2}g_{i+1}$ $=\tfrac{1}{4}f_0(2-K)(1-K)^i$;

eighth, bound the bond areas by locating the sets of bounded bond areas:

$\{\alpha_1\ \phi_0\ \phi_1\ b_1,\ \alpha_3\ \phi_2\ \phi_2\ b_3\ \ldots\ \alpha_{2n+1}\ \phi_{2n}\ \phi_{2n+1}\ b_{2n+1},\ \ldots\}$ and $\{a_2\ \phi_1\ \phi_2\ b_2,\ a_4\ \phi_3\ \phi_4\ b_4\ \ldots\ \alpha_{2n}\ \phi_{2n-1}\ \phi_{2n}\ b_{2n}\ \ldots\}$;

ninth, bound the free areas by locating the sets of bounded free areas $\{b_0\ \phi_0\ a_1,\ b_2\ \phi_2\ a_3,\ \ldots\ b_{2n}\ \phi_{2n}\ a_{2n+1},\ \ldots\}$ and $\{b_1\ \phi_1\ a_2,\ b_3\ \phi_3\ a_4\ \ldots\ b_{2n-1}\ \phi_{2n-1}\ a_{2n}\ \ldots\}$;

tenth, draw a curve similar to the set of $\{\xi_i\}$ at a distance thereto equal to $\tau$; and eleventh, cut the ribbon along the curve of step ten and $\{\xi_i\}$.

9. A method of forming an unexpanded block of honeycomb for a conical core as defined in claim 8 which comprises forming a plurality of ribbons each in accordance with the steps of said claim 8, and bonding the corresponding juxtaposed bond areas together, the number of said ribbons for a complete cone being approximately $4\pi\gamma_0/h_0$.

10. A method of forming an expanded conical core as defined in claim 8 which comprises forming a plurality of ribbons each in accordance with the steps of claim 8, the number of said ribbons being approximately $4\pi\gamma_0/h_0$, bonding the corresponding juxtaposed bond areas together, and expanding the bonded ribbons to conical shape.

11. A method of forming an individual ribbon for a cylindrical core in unexpanded form for a solid figure having an external cylindrical surface and comprising a plurality of regularly arranged honeycomb cells defined by a plurality of ribbons having bond areas and free areas and wherein:

$\gamma_0$ is the radius of the cylinder,
$h_0$ is the cell size, and
$\tau$ is the wall thickness;

and wherein by calculation are determined $f_0 = h_0/\sqrt{3}$,
$k = f_0/\gamma_0$, and
$R_0 = 4\gamma_0$;

the steps of said method comprising:

first select a point $O_0$ on a straight line and locate on said line $g_0$ at a distance from $O_0$ equal to $R_0$ and draw an arc with $O_0$ as center, $R_0$ as radius, and the middle of $g_0$ as starting point and of extended length;

second, on said arc measure from $g_0$ successive arc lengths $\xi_0 = 2f_0$ to locate the middle of $g_1, g_2, \ldots g_m$;

third, join the middles of $g_1, g_2, \ldots g_m$, with $O_0$; to locate the set of $\{R_0, R_1, R_2 \ldots R_m\}$ and on said last-mentioned set locate the set $\{\sigma_0, \sigma_1, \sigma_2, \ldots \sigma_m\}$ each located from said arc $\gamma_0$;

fourth locate the set of points $\{\phi_0, \phi_1, \phi_2, \ldots \phi_m\}$ at the mid-point of $\sigma_1, \sigma_{1+1}$;

fifth, subdivide the arc lengths from the centers of $\{g_1, g_2, \ldots g_m\}$ to locate the set of points $\{b_0, b_1, \ldots b_m\}$; and the set $\{a_1, a_2, \ldots a_m\}$ such that the distance from the middle of $g_i$ to $b_i = \frac{1}{2} g_i$ and the distance from $b_1$ to $a_{1+1} = f_0$;

sixth, bound the bond areas by locating the sets of bounded bond areas:

$\{\alpha_1\ \phi_0\ \phi_1\ b_1,\ \alpha_3\phi_2\ \phi_3\ b_3,\ \ldots\ \alpha_{2n+1}\ \phi_{2n}\ \phi_{2n+1}\ b_{2n+1}\}$ and $\{\alpha_2\ \phi_1\ \phi_2\ b_2,\ \alpha_4\ \phi_3\ \phi_4\ b_4\ \ldots\ \alpha_{2n}\ \phi_{2n-1}\ \phi_{2n}\ b_{2n}\}$;

seventh, bound the free areas by locating the sets of bounded free areas:

$\{b_0\ \phi_0\ a_1,\ b_2\ \phi_2\ a_3\ \ldots\ b_{2n}\ \phi_{2n}\ a_{2n+1}\}$ and $\{b_1\ \phi_1\ a_2,\ b_3\ \phi_3\ a_4\ \ldots\ b_{2n-1}\ \phi_{2n-1}\ a_{2n}\}$;

eight, draw an arc parallel to the arc of step one at a distance therefrom equal to $\tau$; and ninth, cut the ribbon along the arcs of steps one and eight.

12. A method of forming an unexpanded block of honeycomb for a cylindrical core as defined in claim 11 which comprises forming a plurality of ribbons each in accordance with the steps of claim 11, and bonding the corresponding juxtaposed bond areas together, the number of said ribbons for a complete cylinder being approximately $4\pi\gamma_0/h_0$.

13. A method of forming an expanded cylindrical core as defined in claim 11 which comprises forming a plurality of ribbons each in accordance with the steps of claim 11, the number of said ribbons for a complete cylinder being approximately $4\pi\gamma_0/h_0$; bonding the juxtaposed bond areas together; and expanding the bonded ribbons to cylindrical shape.

References Cited in the file of this patent

UNITED STATES PATENTS

| | | |
|---|---|---|
| 876,756 | Karker et al. | Sept. 6, 1961 |
| 3,016,315 | Robinson | Jan. 9, 1962 |
| 3,070,198 | Haskell | Dec. 25, 1962 |
| 3,100,928 | Bryand | Aug. 20, 1963 |